United States Patent
Li et al.

(10) Patent No.: US 8,847,534 B2
(45) Date of Patent: Sep. 30, 2014

(54) CONVERTER, MOTOR DRIVING MODULE, AND REFRIGERATING APPARATUS

(75) Inventors: Dongsheng Li, Mito (JP); Yasuo Notohara, Hitachiota (JP)

(73) Assignees: Hitachi Appliances, Inc., Tokyo (JP); Hitachi Industrial Equipment Systems Co., Ltd., Tokyo (JP)

( * ) Notice: Subject to any disclaimer, the term of this patent is extended or adjusted under 35 U.S.C. 154(b) by 150 days.

(21) Appl. No.: 13/580,446

(22) PCT Filed: Mar. 31, 2010

(86) PCT No.: PCT/JP2010/002340
§ 371 (c)(1),
(2), (4) Date: Aug. 22, 2012

(87) PCT Pub. No.: WO2011/121653
PCT Pub. Date: Oct. 6, 2011

(65) Prior Publication Data
US 2012/0319630 A1 Dec. 20, 2012

(51) Int. Cl.
*H02P 11/04* (2006.01)
*H02M 1/42* (2007.01)

(52) U.S. Cl.
CPC ............ *H02M 1/4216* (2013.01); *Y02B 70/126* (2013.01)
USPC .......................................... 318/438; 318/702

(58) Field of Classification Search
CPC ................. H02J 3/36; H02J 3/01; H02J 5/00; H02J 3/18; H02J 3/1814; H02J 7/345; H02M 7/53871; H02M 7/219; H02M 1/4233; H02M 7/2173; H02M 2001/123; H02M 3/158; H02K 11/001
USPC ......... 318/430, 438, 449, 459, 474, 478, 479, 318/702
See application file for complete search history.

(56) References Cited

U.S. PATENT DOCUMENTS 5,315,497 A * 5/1994 Severinsky ...................... 363/34
8,274,803 B2 * 9/2012 Swamy et al. ................... 363/39

FOREIGN PATENT DOCUMENTS

| JP | 2857094 A | 11/1998 |
| JP | 2001016856 A | 1/2001 |
| JP | 3422218 A | 4/2003 |
| JP | 2008245463 A | 10/2008 |

* cited by examiner

*Primary Examiner* — Bentsu Ro
(74) *Attorney, Agent, or Firm* — Volpe and Koenig, P.C.

(57) ABSTRACT

A converter includes three AC reactors, a three-phase diode bridge, a plurality of smoothing capacitors connected in series between a DC output side of the three-phase diode bridge and a DC load, two flywheel diodes connected to positive and negative terminals on the DC side of the three-phase diode bridge, respectively. A reactor is inserted between the midpoint of the two flywheel diodes and the midpoint of the smoothing capacitors, three both-way energizing switches are arranged between the AC side of the three-phase diode bridge and the midpoint of the two flywheel diodes. The three both-way energizing switches are controlled to reduce higher harmonic components of power source current, and by the reactor interposed between the midpoint of the two flywheel diodes and the midpoint of the smoothing capacitors, reverse recovery currents of the three-phase diode bridge during turn-on of the three both-way energizing switches are suppressed.

13 Claims, 11 Drawing Sheets

CONTROL
SIGNAL

CONVERTER, MOTOR DRIVING MODULE, AND REFRIGERATING APPARATUS

TECHNICAL FIELD

The present invention relates to a converter for converting three-phase alternating current to direct current, a motor driving module and a refrigerating apparatus.

BACKGROUND ART

A converter for converting three-phase alternating current (AC) to direct current (DC) is used for, for example, a motor driving inverter, a battery charger/discharger or a refrigerating apparatus (such as air conditioner or refrigerator). When the converter uses a three-phase diode rectifier, many power source current higher harmonics are generated, having an influence upon an electric power system to now give rise to a social problem.

In recent years, higher harmonics regulations, including those by IEC (International Electrical Standards Conference): LEC61000-3-2 (phase current<16 A and IEC61000-3-12 (16 A<phase current<75 A), have been established in Europe, China and Japan. In future, countermeasures against power source higher harmonics in those apparatus are expected to be necessary.

On the other hand, by using a three-phase PWM converter constituted by 6 semiconductor power devices, reduction of higher harmonics in input current and stabilization of output DC voltage can be controlled but many semiconductor power devices and a complicated control means are needed, thus raising a problem that costs of apparatus increase to a great extent.

Especially, in civil and industrial apparatus such as air conditioners, general-purpose inverters and electric motorcar chargers which make much account of costs of products, inexpensive countermeasures against higher harmonics have been desired.

Conventionally, as inexpensive countermeasures against higher harmonics in the three-phase converter, a method has been proposed, as described in "Patent Literature 1" and "Patent Literature 2" for instance, according to which an AC reactor and three both-way energizing type switches are provided on the input side of a three-phase diode rectifier and the both-way energizing type switches are turned on nearby a zero-cross alone of power source voltage of each phase so as to improve the input current.

CITATION LIST

Patent Literatures

Patent Literature 1: Japanese Patent No. 3422218
Patent Literature 2: Japanese Patent No. 2857094

SUMMARY OF INVENTION

Technical Problem

The technique described in "Patent Literature 1" requires a large AC reactor for the sake of clearing the higher harmonics regulations and cannot avoid enlarging the size of apparatus and undergoing cost-up. Especially, heat loss in the AC reactor resistance is in square relationship to input current and accordingly, heat generation in the reactor and reduction in the efficiency of apparatus are apprehended during high-load operation.

Further, "Patent Literature 2" can materialize a size reduction of the AC reactor by increasing the number of on/off operations of the both-way energizing type switch but, needs to use a rectification diode of fast recovery type and encounters problems that the cost increases and the appropriation of a conventional diode rectifying circuit can not be allowed.

Accordingly, the present invention offers a converter, a motor driving module and a refrigerating apparatus which can conform to the higher harmonics regulations without resort to employment of a large-size AC reactor and a fast diode.

Solution to Problem

To solve the above problem, a converter for converting three-phase AC to DC according to the present invention comprises:

a three-phase diode bridge, a plurality of smoothing capacitors connected in series between the DC output side of the three-phase diode bridge and a DC load, two flywheel diodes connected to positive and negative terminals on the DC side of the three-phase diode bridge, respectively, a reactor arranged between the midpoint of the two flywheel diodes and the midpoint of the smoothing capacitors, three both-way energizing switches interposed between the AC side of three-phase diode bridge and the midpoint of the two flywheel diodes, and a controller for controlling the three both-way energizing switches, whereby the three both-way energizing switches are controlled.

Further, in the converter according to the present invention, in on/off control of the three both-way energizing switches, at least one of pieces of information indicative of power source phase, power source phase sequence, power source frequency and power source voltage is presumed on the basis of a voltage signal detected by a voltage detection means for detecting voltage between the AC side of the three-phase diode bridge and the negative terminal of the smoothing capacitor, and an on/off control signal for the both-way energizing switch is adjusted with the help of the presumed information.

Further, in the converter according to the present invention, at least one of pieces of information indicative of power source phase, power source phase sequence, power source frequency and power source voltage is presumed by comparing the voltage signal detected by the voltage detection means to a predetermined voltage value.

Further, in the converter according to the present invention, the predetermined voltage value is adjusted to about ¼ to ⅓ of an amplitude value of the voltage signal by using the amplitude value or an average value of the voltage signals detected by the voltage detection means.

Further, in the converter according to the present invention, in the on/off control of the three both-way energizing switches, a power source phase is presumed by using the voltage signal detected by the voltage detection means, a modulation wave is prepared from the presumed phase by using a preset modulation wave table, and on/off control signals for the three both-way energizing switches are generated by comparing the modulation wave to a carrier wave.

Further, in the converter according to the present invention, in the on/off control of the three both-way energizing switches, the magnitude and forward and backward positions of the modulation wave are adjusted by using load information of a DC load and the on/off control signals for the three both-way energizing switches are adjusted in accordance with variations in the DC load.

Further, in the converter according to the present invention, a general-purpose rectification diode is used as the diode constituting the three-phase diode bridge.

Further, in the converter according to the present invention, a general-purpose diode is used as the flywheel diode.

Further, in the converter according to the present invention, the size of the reactor inserted between the midpoint of the two flywheel diodes and the midpoint of the smoothing capacitors has a capacity capable of suppressing an excessive turn-on current passing through the three both-way energizing switches.

Further, in the converter according to the present invention, an inductance value (L) of the reactor inserted between the midpoint of the two flywheel diodes and the midpoint of the smoothing capacitors is calculated from an equation $$L = Ed \times Trr / Isw$$

by using a DC side voltage (Ed) of the three-phase diode bridge, a recovery time (Trr) of the diode constituting the three-phase diode bridge and a rated current (Isw) of the both-way energizing switch.

Further, in the converter according to the present invention, a current capacity of the reactor inserted between the midpoint between the two flywheel diodes and the midpoint between the smoothing capacitors is set to about less than ¼ of that of the AC reactor.

Also, to solve the above problems, a motor driving module for converting three-phase AC and supplying it to a motor according to the present invention comprises a three-phase diode bridge, a plurality of smoothing capacitors connected in series between the DC output side of three-phase diode bridge and a DC load, two flywheel diodes connected to positive and negative terminals on the DC side of three-phase diode bridge, respectively, a reactor inserted between the midpoint of the two flywheel diodes and the midpoint of the smoothing capacitors, three both-way energizing switches interposed between the AC side of three-phase diode bridge and the midpoint of the two flywheel diodes, and a controller for controlling the three both-way energizing switches, whereby the three both-way energizing switches are controlled.

Also, to solve the above problems, a refrigerating apparatus for converting three-phase AC and supplying it to a motor according to the invention comprises a three-phase diode bridge, a plurality of smoothing capacitors connected in series between the DC output side of three-phase diode bridge and a DC load, two flywheel diodes connected to positive and negative terminals on the DC side of three-phase diode bridge, respectively, a reactor inserted between the midpoint of the two flywheel diodes and the midpoint of the smoothing capacitors, three both-way energizing switches arranged between the AC side of three-phase diode bridge and the midpoint of two flywheel diodes, and a controller for controlling the three both-way energizing switches, whereby the three both-way energizing switches are controlled.

According to the present invention, higher harmonics components in power source current are reduced by controlling the both-way energizing switches, the reactor inserted between the midpoint of the two flywheel diodes and the midpoint of smoothing capacitors materializes suppression of an inverse recovery current of the three-phase diode bridge during turn-on of the three both-way energizing switches, and the two flywheel diodes materializes suppression of overvoltage during turn-off of the three both-way energizing switches.

Advantageous Effects of Invention

According to the present invention, without adopting any large-size AC reactor and fast diode, the converter, the motor driving module and the refrigerating apparatus can be provided which can conform to the higher harmonics regulations.

DESCRIPTION OF EMBODIMENTS

The present invention will now be described with reference to the drawings.

Embodiment 1

An embodiment of the configuration and control of a three-phase converter according to the present invention will be described hereinafter.

Figure 1:
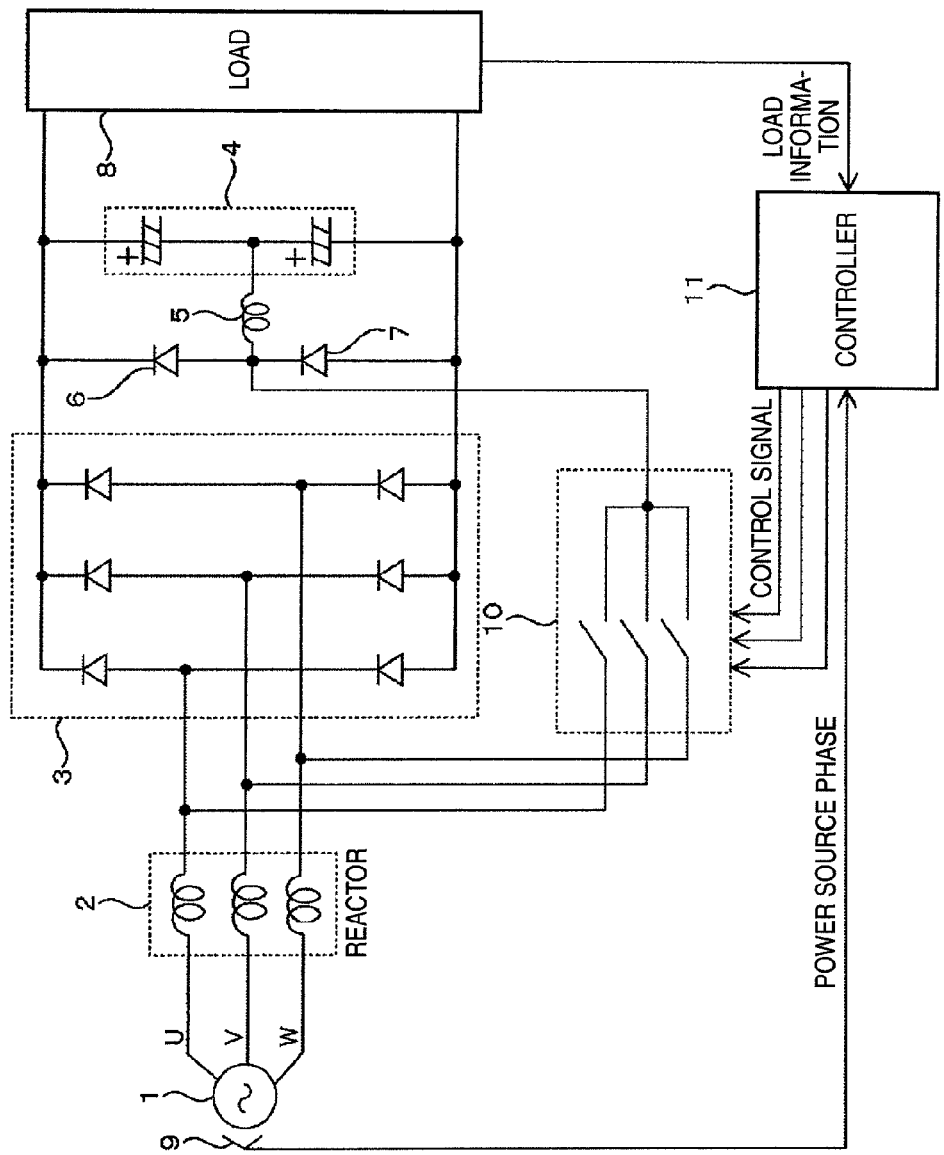
FIG. 1 is a diagram illustrating the configuration of a converter according to an embodiment of the present invention.

FIG. 1 is a diagram illustrating the configuration of a converter according to a first embodiment of the present invention.

The converter includes three AC reactors 2 connected to a three-phase AC power source 1, a three-phase diode bridge 3 constituted by six diodes, a plurality of smoothing capacitors 4 connected in series on the DC side of three-phase diode bridge 3, two flywheel diodes 6 and 7 connected to positive and negative terminals on the DC side of three-phase diode bridge 3, a reactor 5 inserted between the midpoint of flywheel diodes 6 and 7 and the midpoint of smoothing capacitors, three both-way energizing switches 10 connected between the AC input side of three-phase diode bridge 3 and the midpoint of flywheel diodes 6 and 7, a controller 11 for controlling the three both-way energizing switches 10, and a power source phase detection means 9.

In the plural smoothing capacitors 4 on the DC side, capacitors of the same capacitance are connected in series with each other, forming the midpoint for DC voltage. As will be shown later with reference to FIG. 2, the three both-way energizing switches 10 can each be constituted by a one-phase diode bridge 12 and a single semiconductor power device 13 (MOSFET or IGBT device).

Figure 2:
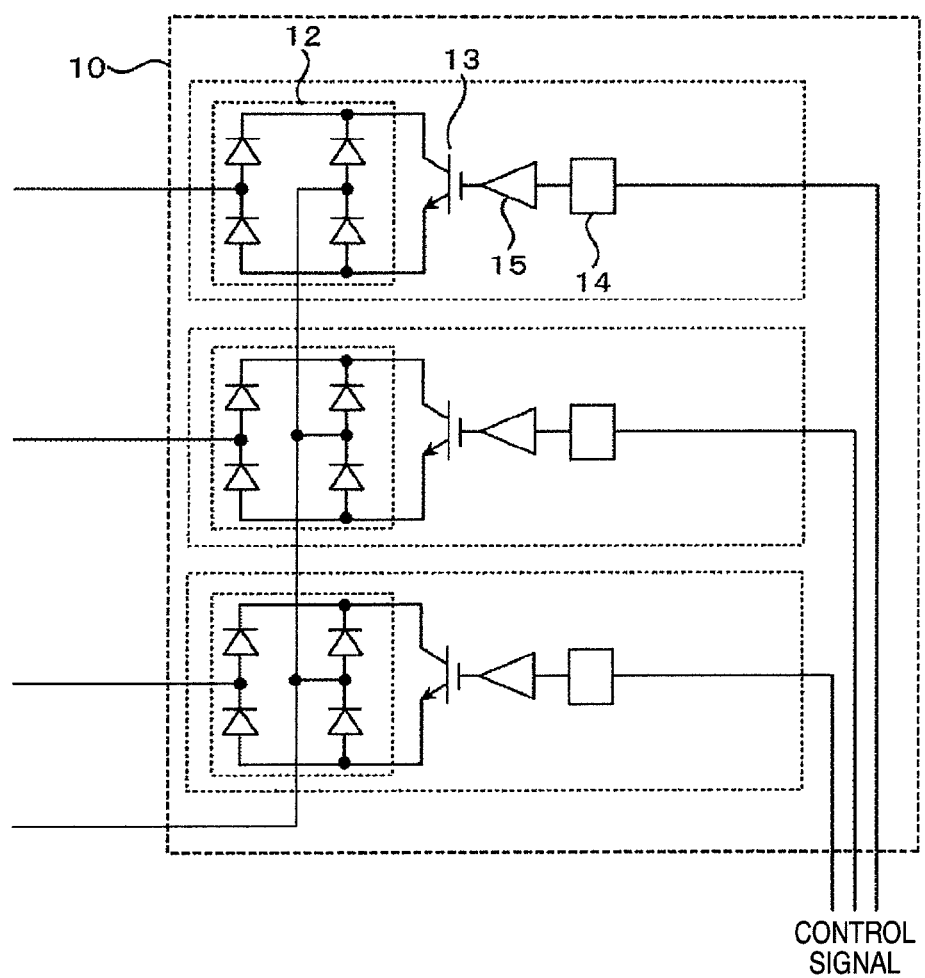
FIG. 2 is a diagram illustrating the construction of both-way energizing switch and driving circuit according to an embodiment of the invention.

FIG. 2 illustrates an example of arrangement of the semiconductor power device 13 constituting the both-way energizing switch 10. A driving terminal for the semiconductor power device is connected to a driving circuit 15 via an insulating means 14 such as a photo-coupler or a transformer as shown in FIG. 2 in order to set up electrical insulation from the controller 11.

By using a semiconductor arithmetic operation device such as a microcomputer or DSP (digital signal processor), the controller 11 processes a power source phase supplied from the power source phase detection means 9 and load information supplied from the load 8 to thereby generate an on/off control signal for each of the semiconductor power devices.

Figure 3:
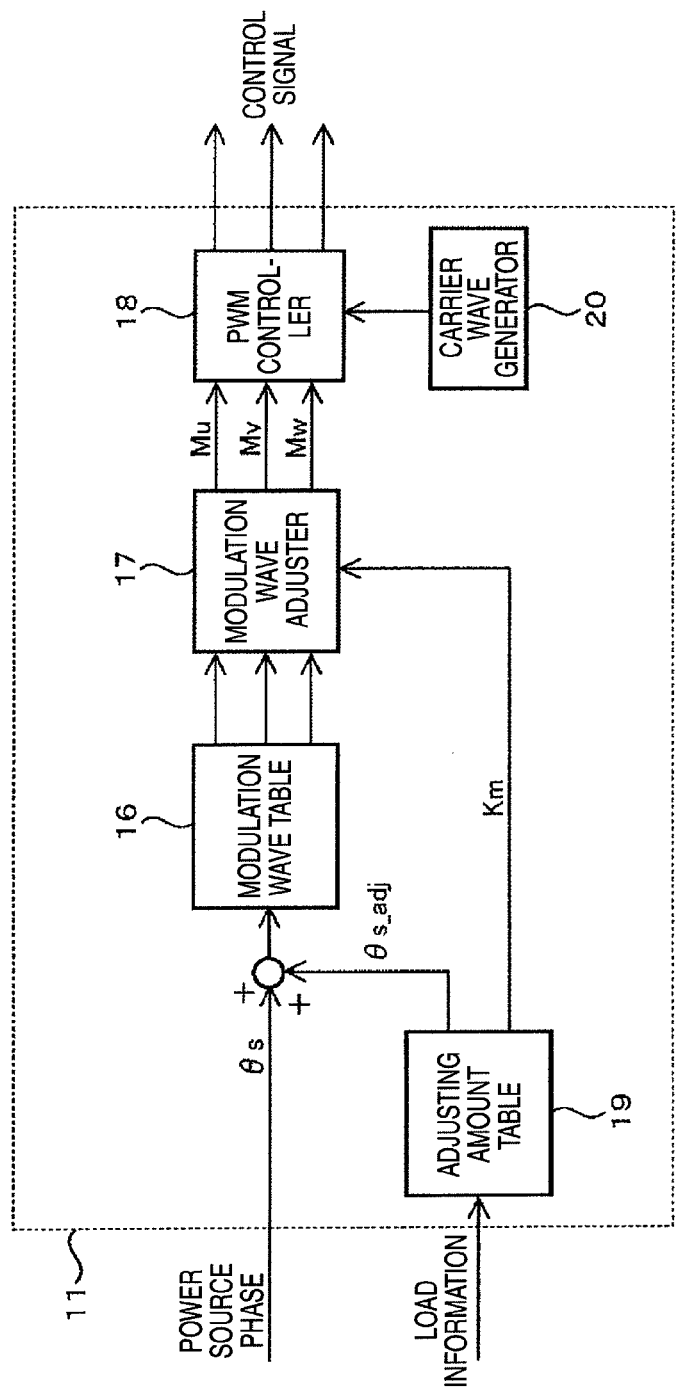
FIG. 3 is a diagram illustrating the functional block construction of a controller in the converter according to an embodiment of the invention.

The controller 11 has the functional flock construction as illustrated in FIG. 3 and each function is materialized with a program the microcomputer has. More specifically, a three-phase modulation wave is prepared from a detected power source phase θs by using a preset modulation wave table 16. Further, the forward and backward positions and the magnitude of the modulation wave are adjusted from the load information by using a preset adjustment amount table 19.

Figure 4:
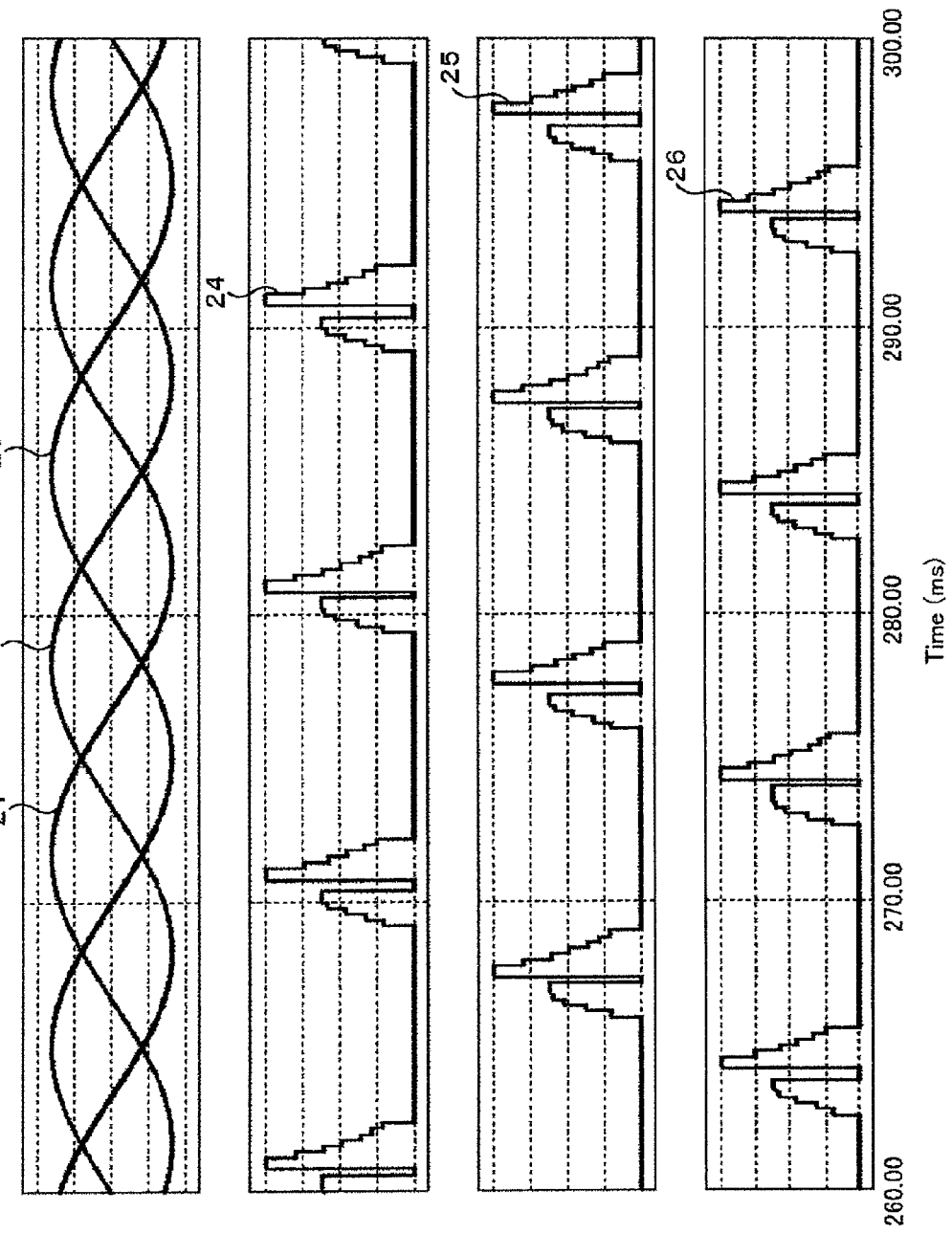
FIG. 4 is a diagram showing waveforms of power source voltage and modulation waves in respective phases.

Illustrated in FIG. 4 is an example of power source voltage waveforms 21, 22 and 23 of individual phases and three-phase modulation wave table waveforms 24, 25 and 26 of the individual phases set in advance in a memory inside the microcomputer. The modulation wave table is prepared in advance through simulation under a predetermined condition or experiments with an actual product apparatus.

Further, when the power source input current changes, a corresponding modulation wave must be adjusted for maintaining the effect of suppression of higher harmonics. In a simple realization method, by using the adjustment amount table 19 set in advance as shown in FIG. 3, a phase tuning amount θs_adj and a gain Km are determined so as to adjust the forward and backward positions and the magnitude of the modulation wave.

Finally, a PWM controller 18 compares the adjusted modulation waves Mu, Mv and Mw with a carrier wave (triangular or saw-tooth wave) and outputs a PWM (Pulse Width Modulation) control signal so as to control on/off of the both-way energizing power device 13.

Through the aforementioned PWM control, the current higher harmonics can be reduced by adopting even the small AC reactor and consequently, the volume and cost of the apparatus can be reduced.

Figure 5:
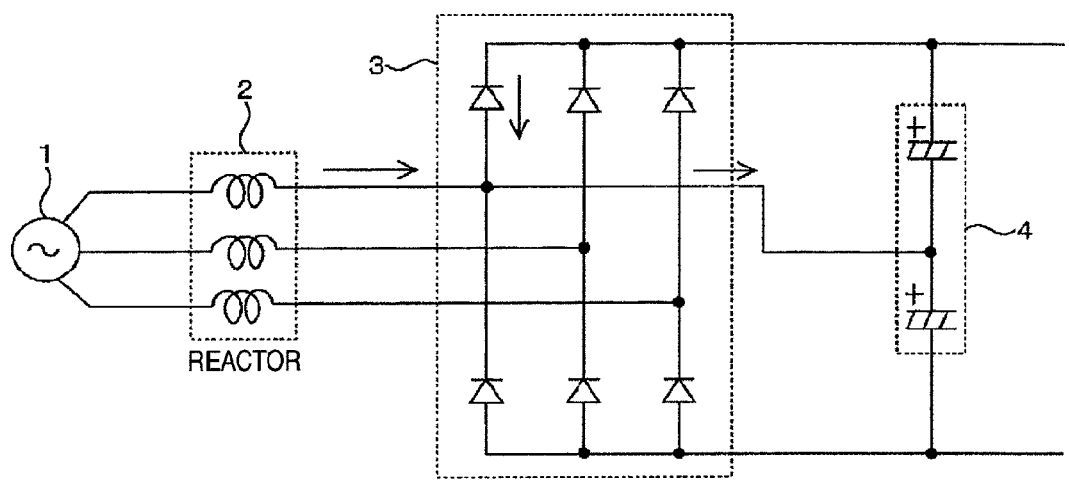
FIG. 5 is an equivalent circuit diagram when a both-way energizing switch in the converter is turned on according to an embodiment of the invention.
Figure 6:
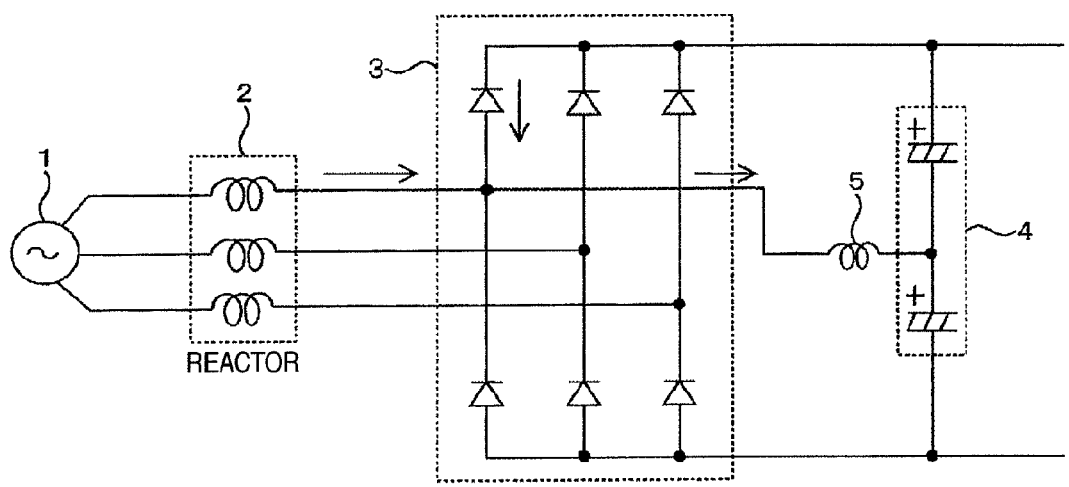
FIG. 6 is an equivalent circuit diagram when a both-way energizing switch in the converter is turned on in the presence of a reactor according to an embodiment of the invention.

Illustrated in FIGS. 5 and 6 are equivalent circuits in which under the condition of forward conduction of an upper arm diode corresponding to the U-phase of three-phase diode bridge, the both-way energizing switch corresponding to the U-phase is turned on.

In the absence of the reactor to be inserted between the midpoint of flywheel diodes 6 and 7 and the midpoint of smoothing capacitors as shown in FIG. 5, the recovery time of the rectification diode is long at an instant that the both-way energizing switch corresponding to the U-phase is turned on and consequently, an over-current flows through the both-way energizing switch for a short period of time. The generation of excessive turn-on current adversely affects the semiconductor device to lower its reliability and to increase its loss and affects the apparatus to cause it to generate radiation noises.

In the presence of the reactor as shown in FIG. 6, on the other hand, the change rate of current can be limited and the over current can be suppressed.

Figure 7:
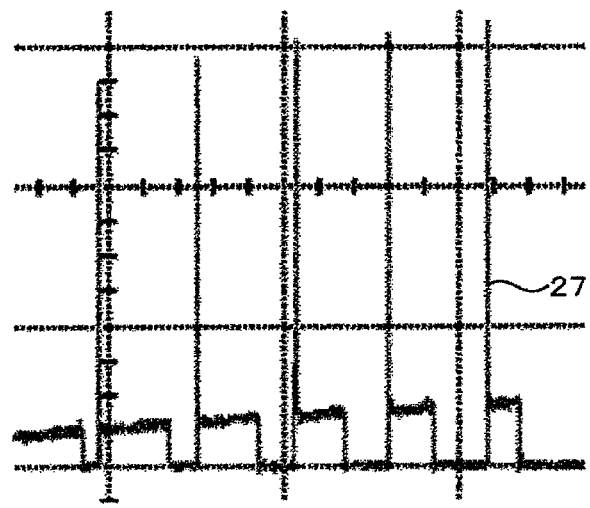
FIG. 7 is a current waveform diagram of the both-way energizing switch in the converter according to an embodiment of the invention.
Figure 8:
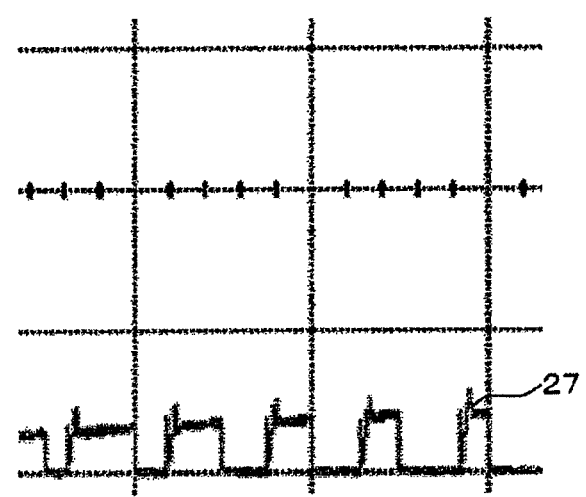
FIG. 8 is a current waveform diagram of the both-way energizing switch in the converter in the presence of the reactor according to an embodiment of the invention.

Illustrated in FIGS. 7 and 8 are actually measured conduction current waveforms 27 passed through the both-way energizing switch in the circuits shown in FIGS. 5 and 6. As shown in FIG. 8, it was confirmed that the turn-on current of both-way energizing switch can be suppressed by adding the reactor.

Also, when turning off, the both-way energizing switch causes the current flowing through the reactor to return to the smoothing capacitor via the flywheel diode and as a result, voltage applied to the both-way energizing switch can be suppressed to lower than the DC voltage and the energy loss can be reduced.

Since the insertion reactor suppresses only the turn-on current of both-way energizing switch, its inductance value may be determined pursuant to the following equation:

$$L=(Ed/2) \times Trr/(Isw/2)=Ed \times Trr/Isw \quad (1)$$

where L represents an inductance value of the reactor, Ed a DC voltage value, Trr a diode recovery time of the three-phase diode bridge and Is w a rated current of the both-way energizing switch.

For example, when the DC voltage value (Ed) is 500 [V], the diode recovery time (Trr) of three-phase diode bridge is 5 [μs] and the rated current (Isw) of both-way energizing switch is 10 [A], the inductance value of reactor may approximately suffice for $$L=500 \times 5/10=250 \text{ [μH]}.$$

Namely, the inductance value of inserted reactor may be set as being sufficiently smaller than that of AC reactor (1/20 or less).

Also, since the current to be passed through the reactor corresponds to only the current under on-condition of each device, its current capacity may be about ¼ or less of that of the input current to the apparatus.

In addition, since the current of flywheel diode is also very small, an inexpensive general-purpose product may be adopted.

As will be seen from the foregoing description, the turn-on current suppression circuit according to the present invention can be materialized at low costs and with the present invention used, a converter for reducing higher harmonics can be materialized by employing even a small size reactor and a general-purpose rectification diode of long inverse recovery time. Accordingly, reduction in cost and volume of a product and improvements in reliability and efficiency can be contrived.

Embodiments of the construction and control of the three-phase converter according to the present invention have been set forth so far.

Embodiment 2

An embodiment of a motor driving apparatus of the present invention will now be described.

Figure 9:
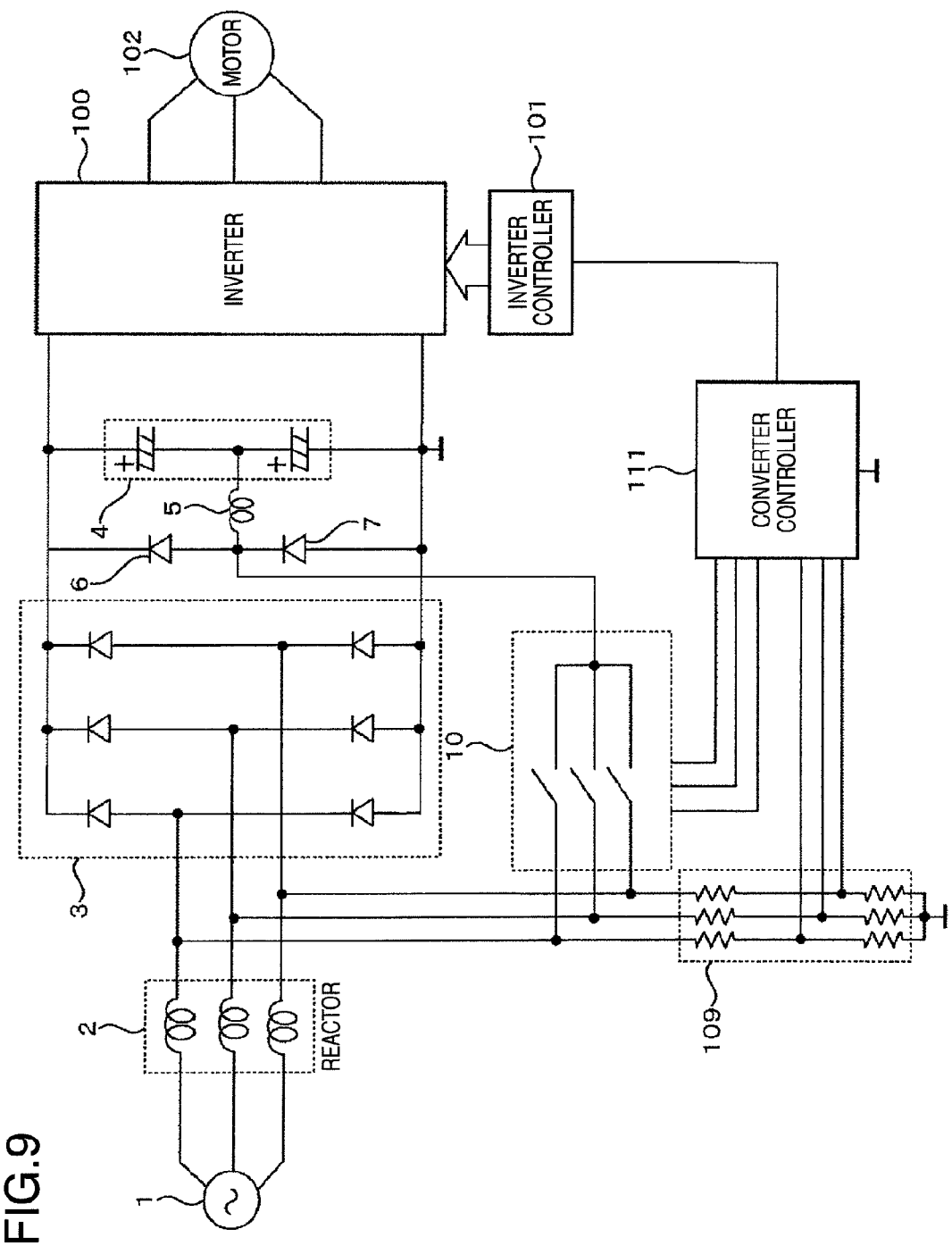
FIG. 9 is a diagram illustrating the configuration of a motor driving apparatus according to an embodiment of the invention.

Referring to FIG. 9, a motor driving apparatus according to a second embodiment of the invention is configured as illustrated therein.

A converter portion for converting three-phase AC to DC is the same as that shown in FIG. 1. By using an inverter 100 and an inverter controller 101 on the DC output side of a converter circuit, a motor 102 is driven. Motor load information the inverter controller 101 has is transmitted to a controller 111 through a means such as communication. By using the load information, the controller 111 adjusts the magnitude and position of a modulation wave so as to control the both-way energizing switch 10.

With this configuration, fabrication and installation of the converter circuit may alternatively be separated from those of the inverter circuit and therefore, the degree of freedom of design and fabrication of products can be improved. Especially, since the power source higher harmonics can be reduced by adding only the converter portion to the existing inverter module and motor drive substrate, costs of development and manufacture of products can be reduced.

In this embodiment, a scheme of detecting the power source phase is adopted according to which voltage signals Vun, Vvn and Vwn obtained from a voltage dividing resistor 109 are used with the aim of reducing costs of parts and simplifying the wiring.

Figure 10:
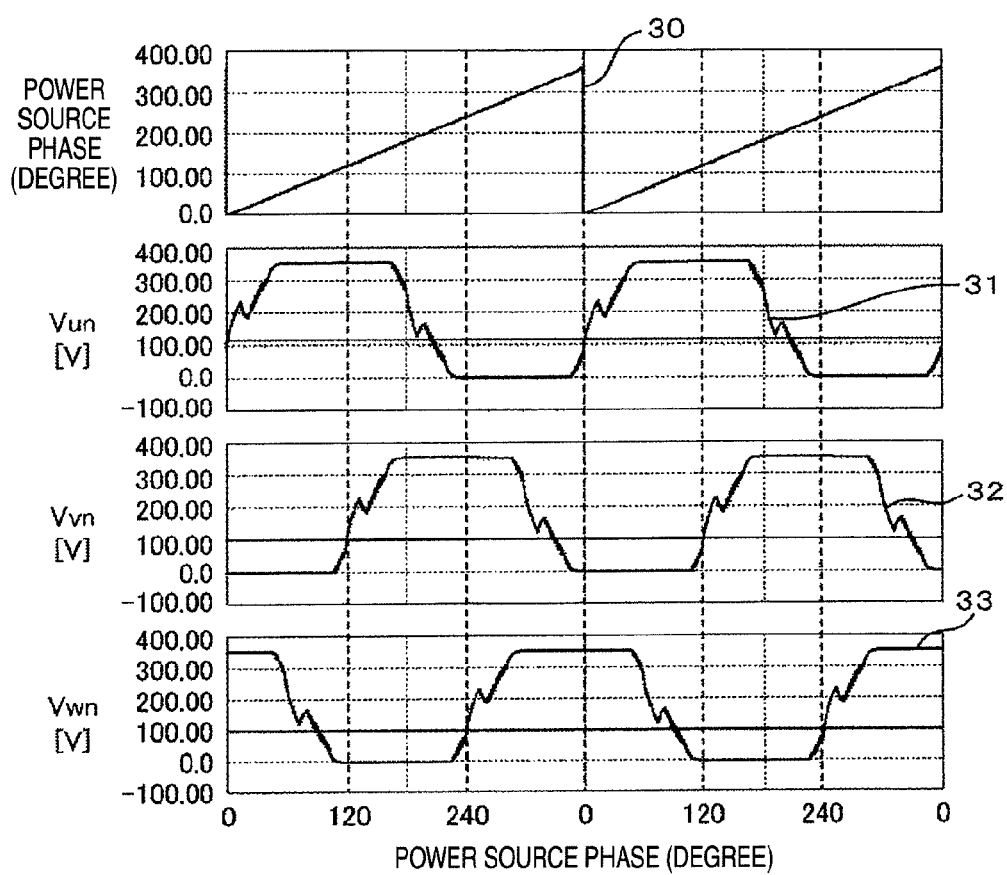
FIG. 10 is a waveform diagram showing the power source phase and detected voltage signals.

Illustrated in FIG. 10 are detected voltage waveforms of individual phases 31, 32 and 33 obtained from the voltage dividing resistor 109 and a power source phase waveform 30. It has been proven from these waveforms that when the voltage signals obtained from the voltage dividing resistor 109 are compared to voltage level values of about ¼ to ⅓ of voltage amplitude value, rising edges of the obtained signals substantially coincide with 0°, 120° and 240° of the power source phase. Accordingly, from these voltage signals, the power source phase can be presumed. Also, from a time difference between adjacent rising edges, the power source frequency can be calculated. Further, from the rising edge sequence, the phase sequence of three-phase power source can be judged.

In addition, by calculating the amplitude value or an average value of the voltage signals, the magnitude of the power source voltage can be presumed.

Actually, in order to further improve the phase detection accuracy, an error Ms in power source frequency is calculated by using PLL (Phase-Locked Loop) process and an error in power source frequency fs 0 inside the microcomputer is corrected automatically.

A process for calculating the power source phase will be described hereunder by making reference to FIG. 11.

Figure 11:
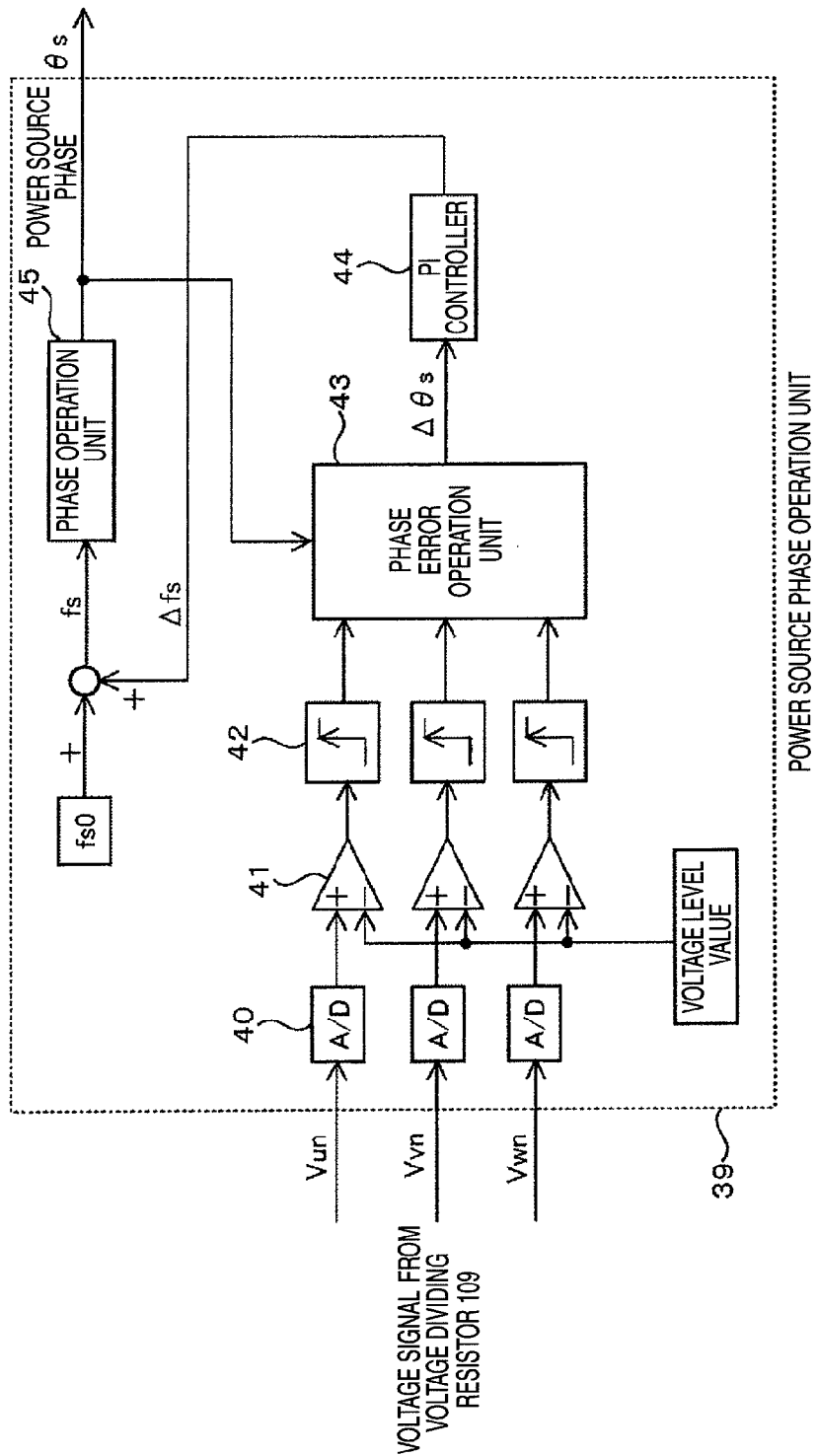
FIG. 11 is a diagram illustrating the functional block construction of a power source phase operation unit in the converter according to an embodiment of the invention.

As shown in FIG. 11, through the use of A/D converters 40, respective voltage detection signals Vun, Vvn and Vwn are detected which in turn are compared to voltage level values to prepare rising edges so that a difference between a corresponding power source phase value (U-phase: 0°, V-phase: 120°, W-phase: 240°) at the time a rising edge is detected and a power source phase calculated inside the microcomputer may be determined and a frequency error Δfs may be calculated by using a PI controller 44. The frequency error is added to a power source frequency initial setting value f s0, so that the inside power source phase can be calculated through an integration process. In case information indicative of the phase sequence and frequency of the power source is not set in advance, however, a judgment must be made from time differences in rising edges and sequences corresponding to the individual phases before proceeding with the phase detection process.

The voltage level value herein may be set to a fixed value (about ¼ to ⅓ of inter-phase voltage amplitude value) in advance in accordance with the power source voltage but when, with a view to reducing the influence of power source voltage variation, adjustment is carried out on line in accordance with a magnitude of power source voltage presumed from the voltage signal obtained from the voltage dividing resistor 109, the phase detection accuracy can further be improved.

Since the error in power source frequency can be adjusted automatically through the PLL process as described above, the power source phase detection error can be small even when the power source frequency varies or the microcomputer oscillator operates with errors.

Further, when the number of A/D converters in the microcomputer is lacking, the power source phase can be calculated through a similar process by using even voltage signals of two phases or that of one phase. With one-phase voltage signal used, however, the phase sequence of the three-phase power source cannot be detected.

With the means and construction as above, power source information necessary for controlling can be detected through the use of the voltage dividing resistor alone and so, reduction in the circuit cost and improvements in the control performance can be contrived. Further, in applying the present invention to global products, power source information (power source frequency, phase sequence, power source voltage and the like) for each region need not be set in advance and accordingly, general-purpose utility and reliability of the apparatus can be improved.

Further, by using an external analog comparator in place of the microcomputer with internal A/D, the phase can also be detected through comparison of the voltage signal detected from the voltage dividing resistor 109 with a voltage level value. In such a construction, the A/D converter is not used and data processing inside the microcomputer can be simplified, the use of an inexpensive low-functional microcomputer can be permitted.

Embodiment 3

Figure 12:
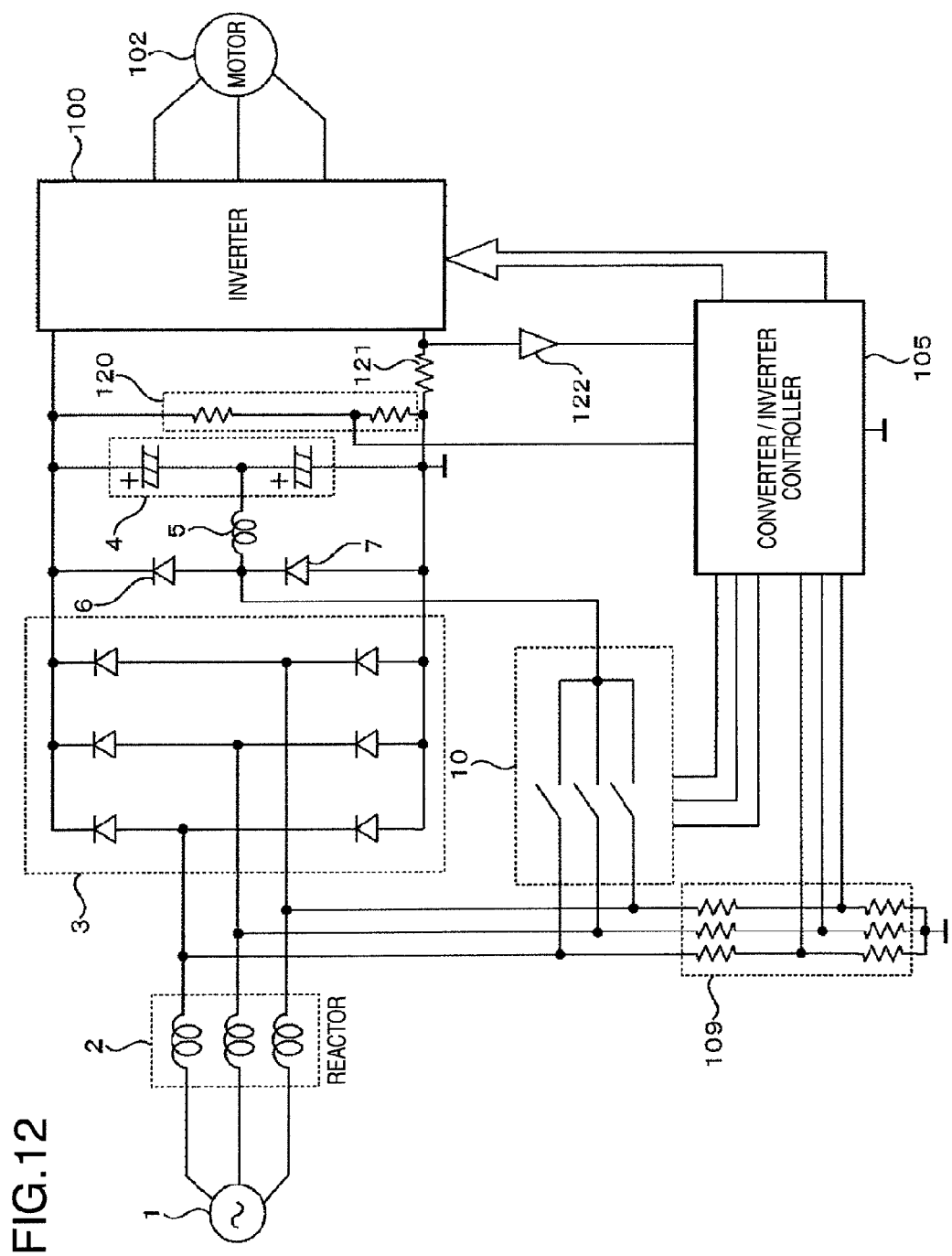
FIG. 12 is a diagram illustrating the configuration of a motor driving apparatus according to an embodiment of the invention.

Referring to FIG. 12, a motor driving apparatus according to a third embodiment of the present invention is configured as illustrated therein.

A converter portion adapted to convert three-phase AC to DC is the same as that shown in FIG. 1. An inverter 100 and an inverter controller 101 are used on the DC output side of a converter circuit to drive a motor 102.

A converter/inverter controller 105 uses a single microcomputer. By using voltage dividing resistors 109 and 120, a shunt resistor 121 and an amplifier 122, a power source phase, a DC voltage and an output current of the inverter are detected which in turn are processed by the converter/inverter controller 105 so as to control the converter and inverter.

With this configuration, the microcomputer for control and the substrate can be shared and so, the cost and volume of the whole of a product can be reduced. Also, since information for control of inverter and that for converter can be shared, the overall control performance can be improved.

Embodiment 4

Figure 13:
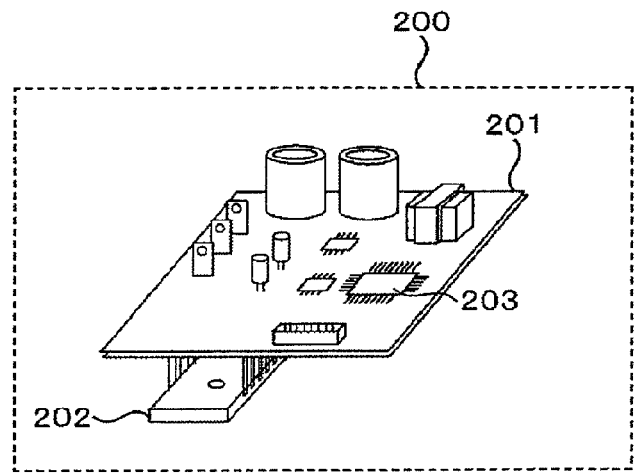
FIG. 13 is a diagram illustrating an external view of a motor driving module according to an embodiment of the invention.

FIG. 13 shows a form of a final product by diagrammatically illustrating an external view of a motor driving module 200 according to a fourth embodiment of the present invention.

The module 200 is a motor driving module in which a semiconductor device representing a power module is carried on a controller substrate 201, and the controller substrate 201 is packaged with the voltage/current detection circuit and the controller described in connection with the previously described embodiment. Corpuscular formation is achieved by module and the cost of apparatus can be reduced. It is to be understood that the module is meant by "a normalized constituent unit" and is constituted by separable parts of hardware/software. From the standpoint of fabrication, parts are preferably structured on the same substrate but this is not limitative. Thus, parts may be structured on a plurality of circuit substrates built in the same chassis.

According to the present embodiment, the cost and volume of the overall product can be reduced and therefore, the general purpose and utility convenience of the motor driving apparatus using the module of the present embodiment can be improved.

Embodiment 5

Figure 14:
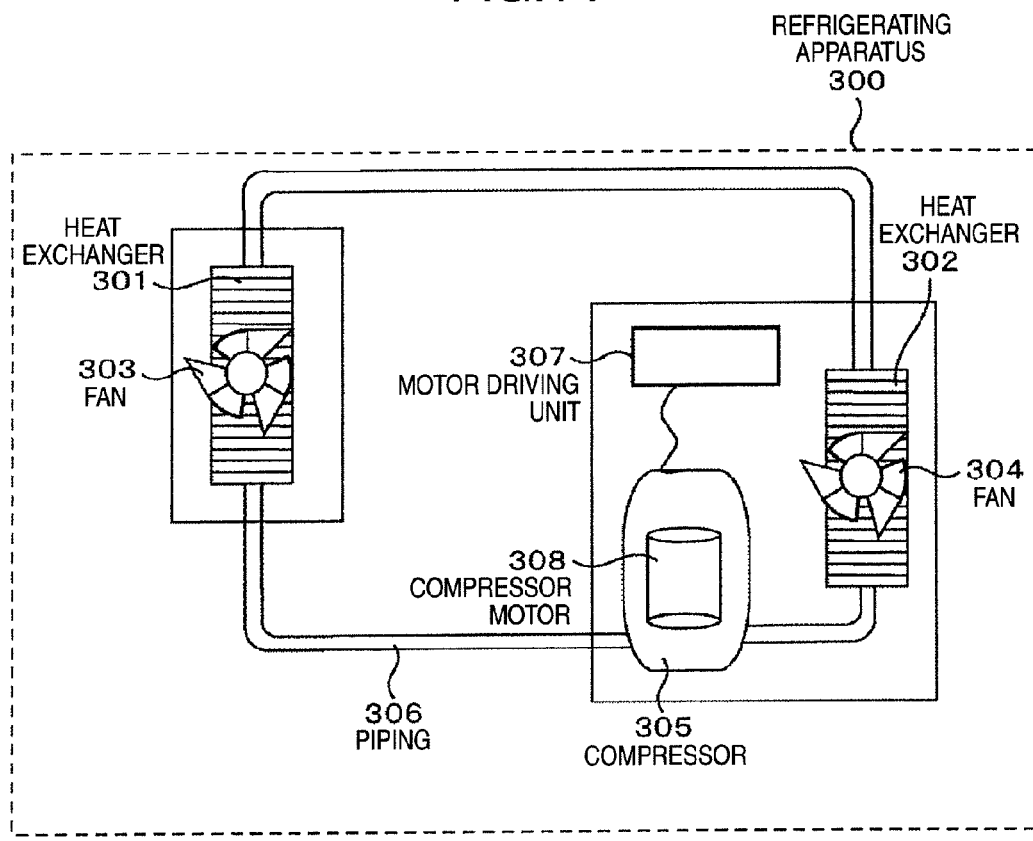
FIG. 14 is a diagram illustrating the structure of a refrigerating apparatus according to an embodiment of the invention.

Referring to FIG. 14, a refrigerating apparatus such as an air conditioner, a refrigerator or the like according to a fifth embodiment of the present invention, having its compressor motor driven by using the aforementioned motor driving module, is constructed as illustrated therein.

The refrigerating apparatus 300 is an apparatus for harmonizing temperatures and comprises heat exchangers 301 and 302, fans 303 and 304, a compressor 305, a piping 306 and a motor driving unit 307. As an compressor motor 308, a permanent magnet synchronous motor or a three-phase induction motor is used which is arranged inside the compressor 305. The motor driving unit 307 converts AC power source to DC which in turn is supplied to a motor driving inverter so as to drive the motor.

By using the converter/inverter module according to the fourth embodiment, higher harmonics in the power source current can be reduced and the power factor can be improved at low costs by adopting even a small size AC reactor and a general-purpose diode and therefore, clearing the higher harmonics regulations can be realized.

REFERENCE SIGNS LIST

1 Three-phase AC power source
2 Three-phase AC reactor
3 Three-phase diode bridge
4 Smoothing capacitors
5 Reactor
6, 7 Flywheel diodes
8 DC load
9 Power source phase detection means
10 Both-way energizing switch
11, 111 Controllers
12 Single-phase diode bridge
13 Semiconductor power device
14 Insulation means
15 Driving circuit
16 Modulation wave table
17 Modulation wave adjuster
18 PWM controller
19 Adjusting amount table
20 Carrier generator
21 U-phase power source voltage waveform
22 V-phase power source voltage waveform
23 W-phase power source voltage waveform
24 Modulation waveform corresponding to U-phase
25 Modulation waveform corresponding to V-phase
26 Modulation waveform corresponding to W-phase
27 Energizing current waveform
30 Power source phase waveform
31 Detection voltage waveform corresponding to U-phase
32 Detection voltage waveform corresponding to V-phase
33 Detection voltage waveform corresponding to W-phase
40 A/D converter
41 Comparator
42 Rising edge detector
43 Phase error operation unit
44 PI controller
45 Phase operation unit
100 Inverter
101 Inverter controller
102 Motor
105 Converter/inverter controller
109 Voltage dividing resistor
120 Voltage dividing resistor for DC voltage detection
121 Shunt resistor
122 Amplifier
200 Module
201 Controller substrate
202 Semiconductor device
203 Microcomputer
300 Refrigerating apparatus
301, 302 Heat exchangers
303, 304 Fans
305 Compressor
306 Piping
307 Motor driving unit
308 Compressor motor

The invention claimed is:

1. A converter for converting three-phase AC to DC comprising:
   three AC reactors connected to a power source for supplying the three-phase AC;
   a three-phase diode bridge;
   a plurality of smoothing capacitors connected in series between the DC output side of said three-phase diode bridge and a DC load;
   two flywheel diodes connected to positive and negative terminals on the DC side of said three-phase diode bridge, respectively;
   a reactor inserted between the midpoint of said two flywheel diodes and the midpoint of said smoothing capacitors;
   three both-way energizing switches arranged between the AC side of said three-phase diode bridge and the midpoint of said two flywheel diodes; and
   a controller for controlling said three both-way energizing switches, whereby said three both-way energizing switches are controlled.

2. A converter according to claim 1, wherein, in on/off control of said three both-way energizing switches, at least one of pieces of information indicative of power source phase, power source phase sequence, power source frequency and power source voltage is presumed on the basis of a voltage signal detected by voltage detection means for detecting a voltage between the AC side of said three-phase diode bridge and the negative terminal of said smoothing capacitor, and an on/off control signal for said both-way energizing switch is adjusted with the help of the presumed information.

3. A converter according to claim 2, wherein the at least one of pieces of information indicative of power source phase, power source phase sequence, power source frequency and power source voltage is presumed by comparing the voltage signal detected by said voltage detection means with a predetermined voltage value.

4. A converter according to claim 3, wherein said predetermined voltage value is adjusted to about ¼ to ⅓ of an amplitude value of said voltage signal by using the amplitude value or an average value of voltage signals detected by said voltage detection means.

5. A converter according to claim 2, wherein in the on/off control of said three both-way energizing switches, the power source phase is presumed by using a voltage signal detected by said voltage detection means, a modulation wave is prepared from the presumed phase by using a modulation wave table set in advance and is compared with a carrier wave to generate on/off control signals for said three both-way energizing switches.

6. A converter according to claim 5, wherein in the on/off control of said three both-way energizing switches, the magnitude and forward and backward positions of said modulation wave are adjusted by using load information of a DC load and on/off control signals for said three both-way energizing switches are adjusted in accordance with variations in DC load.

7. A converter according to claim 1, wherein as the diode constituting said three-phase diode bridge, a general-purpose rectification diode is used.

8. A converter according to claim 1, wherein as said flywheel diode, a general-purpose diode is used.

9. A converter according to claim 1, wherein the size of a reactor inserted between the midpoint of said two flywheel diodes and the midpoint of said smoothing capacitors has a capacity capable of suppressing an excessive turn/on current for said three both-way energizing switches.

10. A converter according to claim 1, wherein an inductance value (L) of the reactor inserted between the midpoint of said two flywheel diodes and the midpoint of said smoothing capacitors is calculated from an equation $$L = Ed \times Trr / Isw$$

by using a DC side voltage (Ed) of said three-phase diode bridge, a recovery time (Trr) of the diode constituting said three-phase diode bridge and a rated current (Isw) of said both-way energizing switch.

11. A converter according to claim 1, wherein the current capacity of the reactor inserted between the midpoint of said two flywheel diodes and the midpoint of said smoothing capacitors is set to about ¼ or less of that of said AC reactor.

12. A motor driving module for converting three-phase AC and supplying it to a motor comprising:
- a three-phase diode bridge;
- a plurality of smoothing capacitors connected in series between the DC output side of said three-phase diode bridge and a DC load;
- two flywheel diodes connected to positive and negative terminals on the DC side of said three-phase diode bridge, respectively;
- a reactor inserted between the midpoint of said two flywheel diodes and the midpoint of said smoothing capacitors;
- three both-way energizing switches arranged between the AC side of said three-phase diode bridge and the midpoint of said two flywheel diodes; and
- a controller for controlling said three both-way energizing switches, whereby said three both-way energizing switches are controlled.

13. A refrigerating apparatus for converting three-phase AC and supplying it to a motor comprising:
- a three-phase diode bridge;
- a plurality of smoothing capacitors connected in series between the DC output side of said three-phase diode bridge and a DC load;
- two flywheel diodes connected to positive and negative terminals on the DC side of said three-phase diode bridge, respectively;
- a reactor inserted between the midpoint of said two flywheel diodes and the midpoint of said smoothing capacitors;
- three both-way energizing switches arranged between the AC side of said three-phase diode bridge and the midpoint of said two flywheel diodes; and
- a controller for controlling said three both-way energizing switches, whereby said three both-way energizing switches are controlled.

* * * * *